(12) United States Patent
Yamamoto

(10) Patent No.: US 10,783,376 B2
(45) Date of Patent: Sep. 22, 2020

(54) INFORMATION PROCESSING APPARATUS

(71) Applicant: CASIO COMPUTER CO., LTD, Tokyo (JP)

(72) Inventor: Futoshi Yamamoto, Hamura (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 114 days.

(21) Appl. No.: 16/059,842

(22) Filed: Aug. 9, 2018

(65) Prior Publication Data
US 2019/0095718 A1 Mar. 28, 2019

(30) Foreign Application Priority Data

Sep. 26, 2017 (JP) .................................. 2017-185276

(51) Int. Cl.
*G06K 9/00* (2006.01)
*G06T 7/90* (2017.01)
(Continued)

(52) U.S. Cl.
CPC ..... *G06K 9/00744* (2013.01); *G06K 9/00335* (2013.01); *G06K 9/4652* (2013.01); *G06T 7/20* (2013.01); *G06T 7/50* (2017.01); *G06T 7/90* (2017.01); *G06T 11/206* (2013.01); *G06T 2207/10016* (2013.01); *G06T 2207/30196* (2013.01); *G06T 2207/30204* (2013.01); *G06T 2207/30221* (2013.01)

(58) Field of Classification Search
CPC ........ G06K 9/00744; G06T 7/90; G06T 7/20; G06T 11/206; G06T 7/50; G06T 2207/30196; G06T 2207/30204

USPC ................ 382/107, 135, 154, 285, 291, 302
See application file for complete search history.

(56) References Cited

U.S. PATENT DOCUMENTS

2012/0158238 A1* 6/2012 Daley ...................... G07C 5/00
701/29.1
2015/0336013 A1 11/2015 Stenzler et al.
(Continued)

FOREIGN PATENT DOCUMENTS

JP S63-262127 A 10/1988
JP 10-276351 A 10/1998
(Continued)

OTHER PUBLICATIONS

JPO; Application No. 2017-185276; Notification of Reasons for Refusal dated Sep. 3, 2019.

*Primary Examiner* — Congvan Tran
(74) *Attorney, Agent, or Firm* — Fitch, Even, Tabin & Flannery LLP

(57) ABSTRACT

An information processing apparatus includes a processor which executes: a video data acquisition process of acquiring data on a video of at least one moving object as video data; a measurement information data acquisition process of acquiring data representing measurement information on the object as measurement information data; an object specifying process of specifying the object corresponding to the measurement information data included in the video, as an analysis target; a color specifying process of specifying a color of the analysis target as an object color; and a determination process of determining the object color specified by the color specifying process as a display color to be displayed when the measurement information data is displayed.

17 Claims, 6 Drawing Sheets

(51) Int. Cl.
  *G06T 7/20*   (2017.01)
  *G06T 11/20*  (2006.01)
  *G06T 7/50*   (2017.01)
  *G06K 9/46*   (2006.01)

(56) References Cited

U.S. PATENT DOCUMENTS

| | | | |
|---|---|---|---|
| 2016/0042251 A1* | 2/2016 | Cordova-Diba | G06K 9/4604 |
| | | | 382/180 |
| 2016/0188977 A1* | 6/2016 | Kearns | G06K 9/00664 |
| | | | 348/113 |
| 2016/0247017 A1* | 8/2016 | Sareen | G06K 9/00369 |
| 2016/0379078 A1* | 12/2016 | Yano | G06K 9/4604 |
| | | | 382/199 |
| 2017/0124769 A1 | 5/2017 | Saito | |
| 2017/0315674 A1* | 11/2017 | Kamamori | G06F 3/0426 |
| 2017/0337698 A1 | 11/2017 | Ueda et al. | |

FOREIGN PATENT DOCUMENTS

| | | |
|---|---|---|
| JP | 2001-25584 A | 1/2001 |
| JP | 2004-080163 A | 3/2004 |
| JP | 2009-106323 A | 5/2009 |
| JP | 2017-526898 A | 9/2017 |
| WO | 2016017121 A1 | 2/2016 |
| WO | 2016139906 A1 | 9/2016 |

\* cited by examiner

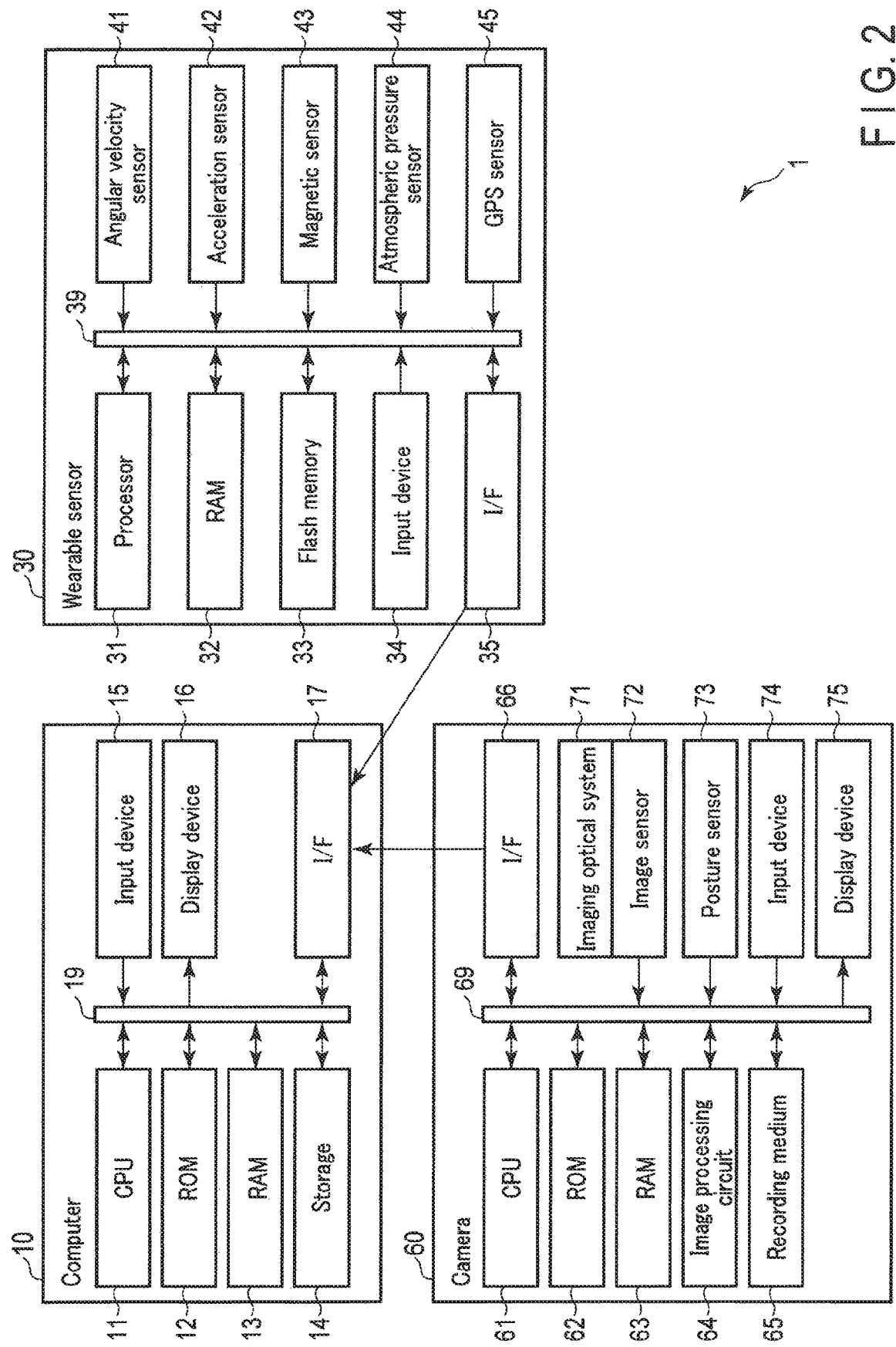
F I G. 2

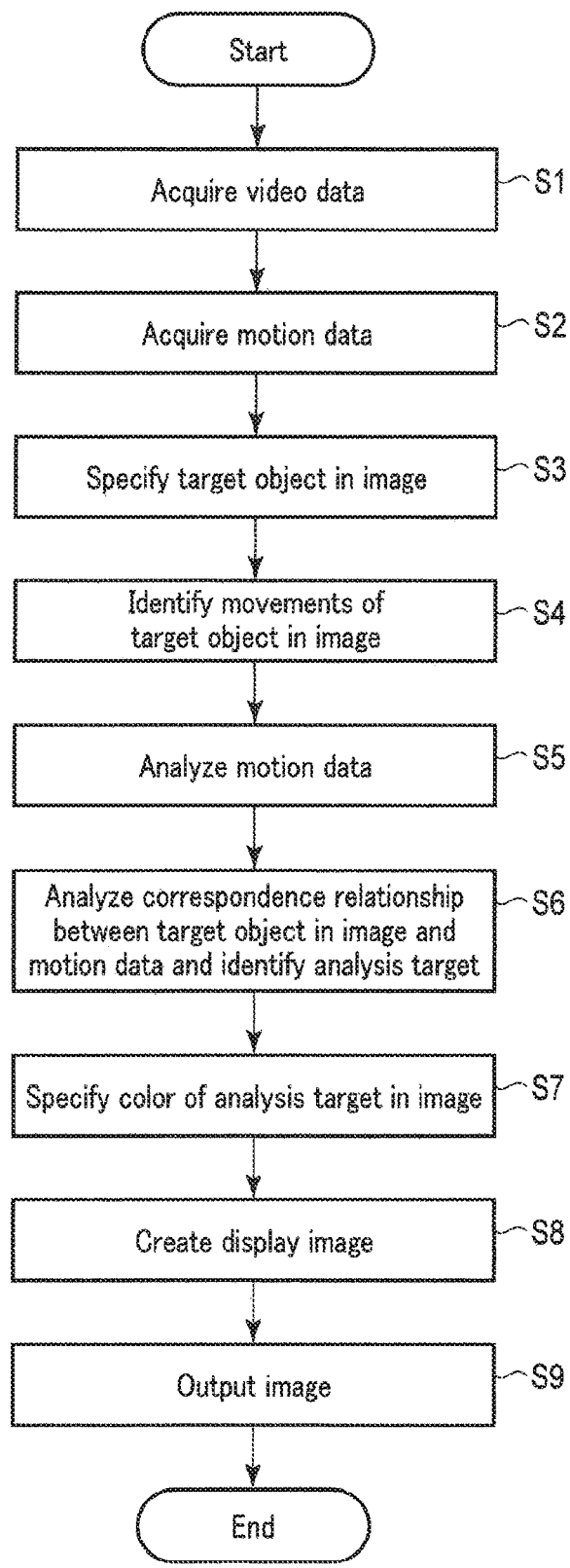
F I G. 3

INFORMATION PROCESSING APPARATUS

CROSS-REFERENCE TO RELATED APPLICATIONS

This application is based upon and claims the benefit of priority from prior Japanese Patent Application No. 2017-185276, filed Sep. 26, 2017, the entire contents of which are incorporated herein by reference.

FIELD OF THE INVENTION

The present invention relates to an information processing apparatus.

BACKGROUND OF THE INVENTION

An exercise form evaluation device is known which captures a video of a subject wearing a sensor and which graphically displays the captured video along with information acquired by the sensor (for example, see Jpn. Pat. Appln. KOKAI Publication No. 2009-106323).

SUMMARY OF THE INVENTION

According to an aspect of the invention, an information processing apparatus includes a processor; and a storage that stores a program to be executed by the processor. The processor operates according to the program stored in the storage and executes: a video data acquisition process of acquiring data on a video of at least one moving object as video data; a measurement information data acquisition process of acquiring data representing measurement information on the object as measurement information data; an object specifying process of specifying the object corresponding to the measurement information data included in the video, as an analysis target; a color specifying process of specifying a color of the analysis target as an object color; and a determination process of determining the object color specified by the color specifying process as a display color to be displayed when the measurement information data is displayed.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention. The components in the drawings are not necessarily to scale relative to each other.

FIG. 2 is a block diagram schematically illustrating a configuration example of the information processing system according to an embodiment.

FIG. 3 is a flowchart schematically illustrating an example of how the computer of the information processing system according to an embodiment operates.

DETAILED DESCRIPTION OF THE PREFERRED EMBODIMENTS

[Outline of Information Processing System]

Figure 1:
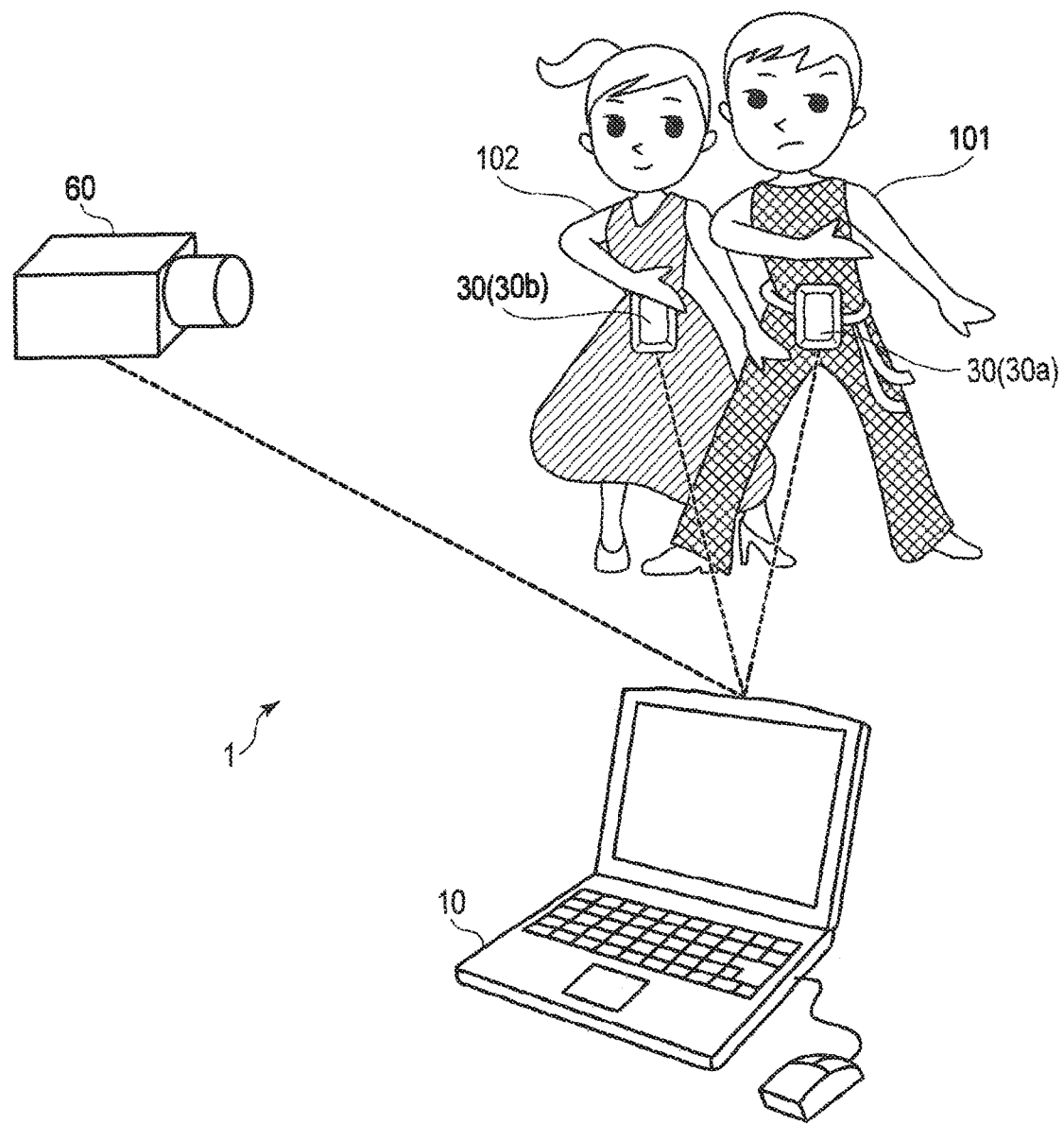
FIG. 1 is a diagram schematically illustrating an information processing system according to an embodiment.

An information display system according to an embodiment of the present invention will be described with reference to the accompanying drawings. FIG. 1 is a diagram for schematically illustrating an information processing system 1 according to the present embodiment. The information processing system 1 includes a computer 10 serving as an information processing apparatus, a wearable sensor 30 serving as a motion sensor, and a camera 60.

The wearable sensor 30 is attached to a moving object, such as a person who takes exercise. The wearable sensor 30 is provided with various sensors for detecting the position, posture, movement, etc. of the object to which it is attached. Data representing the position, posture, movement, etc. of the object acquired by the wearable sensor 30 will be referred to as motion data. The computer 10 acquires motion data from the wearable sensor 30 and analyzes the motion of the object. For example, where the wearable sensor 30 is attached to the central part of the waist of a person, various movements of the person can be analyzed based on the data acquired by the wearable sensor 30.

The camera 60 captures movements of the object to which the wearable sensor 30 is attached, and acquires a video of the object. Data on the video obtained by the camera 60 will be referred to as video data. The computer 10 acquires video data from the camera 60 and performs analysis of the object.

The computer 10 analyzes the video and specifies the object to which the wearable sensor 30 is attached as an analysis target. In addition, the computer 10 specifies, for example, a representative color of the analysis target, as an object color. Further, the computer 10 displays an analysis result obtained based on the data acquired by the wearable sensor 30, as a motion display image. The motion display image includes a graph or the like. At this time, the computer 10 associates the display color of the graph with the object color of the specified analysis target.

For example, FIG. 1 shows a scene where a man 101 dressed in black and a woman 102 dressed in red dance together. The man 101 wears a first wearable sensor 30a. The woman 102 wears a second wearable sensor 30b. The first wearable sensor 30a acquires data on movements of the man 101. The second wearable sensor 30b acquires data on movements of the woman 102. The camera 60 captures movements of the man 101 and woman 102. The computer 10 displays the analysis result obtained for the movements of the man 101 dressed in black and acquired by the first wearable sensor 30a, using a black line, for example. Further, the computer 10 displays the analysis result obtained for the movements of the woman 102 dressed in red and acquired by the second wearable sensor 30b, using a red line, for example.

[Configuration of Information Processing System]

FIG. 2 is a block diagram schematically illustrating a configuration example of the information processing system 1. The configuration of the information processing system 1 will be described with reference to FIG. 2.

<Configuration of Computer>

The computer 10 can be, for example, a personal computer (PC) or a tablet type electronic terminal. The computer 10 includes a central processing unit (CPU) 11, a read only memory (ROM) 12, a random access memory (RAM) 13, a storage 14, an input device 15, a display device 16, and an interface (I/F) 17. These elements are connected together by means of a bus line 19.

The CPU 11 performs processing of various signals. The ROM 12 stores a BIOS and the like. The RAM 13 functions as a main memory of the CPU 11. For example, a dynamic RAM (DRAM) or a static RAM (SRAM) can be used as the RAM 13. For example, a hard disk drive (HDD) or a solid state drive (SSD) is used as the storage 14. The storage 14 stores various kinds of information, including programs and parameters used by the CPU 11. The storage 14 also stores data acquired from the wearable sensor 30, the camera 60, and the like. The RAM 13 and the storage 14 are not limited to those mentioned above and may be replaced with various storage devices.

The input device 15 is, for example, a keyboard, a mouse, or the like. The display device 16 is, for example, a liquid crystal display though it is not limited to thereto. The I/F 17 is used for connection with equipment external to the computer 10. For this connection, wired communications using a universal serial bus (USB) or the like may be used, or wireless communications using the Bluetooth or Wi-Fi may be used.

<Configuration of Wearable Sensor>

The wearable sensor 30, which is a motion sensor according to the present embodiment, includes an angular velocity sensor 41, an acceleration sensor 42, a magnetic sensor 43, an atmospheric pressure sensor 44, a GPS sensor 45, a processor 31, a RAM 32, a flash memory 33, an input device 34, and an interface (I/F) 35. These elements are connected together by means of a bus line 39. The wearable sensor 30 records a history of movements of a person wearing it.

The angular velocity sensor 41 has, for example, a configuration in which MEMS angular velocity sensors are provided in three axis directions, and detects an angular velocity around each axis. The acceleration sensor 42 has, for example, a configuration in which MEMS acceleration sensors are provided in three axis directions, and detects acceleration in each axis direction. The direction of gravity can be detected based on a detection result of the acceleration sensor 42. The magnetic sensor 43 is, for example, a triaxial magnetic sensor and detects a magnetic direction. For example, an azimuth can be detected by detecting geomagnetism with the magnetic sensor 43. The atmospheric pressure sensor 44 is an atmospheric pressure sensor using an electrostatic capacitor, a piezoelectric resistor, a strain gauge or the like, and detects the atmospheric pressure in the vicinity of the wearable sensor 30. The GPS sensor 45 receives signals of the GPS satellites and creates position information on the wearable sensor 30. The signals used by the GPS sensor 45 are not limited to those of the GPS satellites, and signals of other navigation satellites may be used.

The posture of the wearable sensor 30 can be obtained with high accuracy by integrating the angular velocity detected by the angular velocity sensor 41 as time advances, that is, by performing tracking with the posture being changed with time. It should be noted, however, that a detection value of the angular velocity sensor 41 includes an error. Therefore, if detection results are accumulated, errors are also accumulated, and the calculated posture departs from the correct value. For this reason, the error of the calculated posture of the wearable sensor 30 is evaluated based on the direction of gravity and magnetic direction measured by using the acceleration sensor 42 and magnetic sensor 43 whose positional relationships with the angular velocity sensor 41 are fixed, and the posture is corrected based on this error evaluation. The height of the wearable sensor 30 can be obtained using detection values of the GPS sensor 45 and/or detection values of the atmospheric pressure sensor 44. The position of the wearable sensor 30 can be obtained using detection values of the GPS sensor 45. In this manner, the wearable sensor 30 acquires information on its position, posture, motion, etc.

The processor 31 is an integrated circuit, such as a central processing unit (CPU), an application specific integrated circuit (ASIC), or a field programmable gate array (FPGA), and performs processing of various signals. The RAM 32 functions as a main memory of the processor 31. The flash memory 33 stores various kinds of information, including programs and parameters used by the processor 31. The flash memory 33 also stores angular velocity information, acceleration information, magnetic information, atmospheric pressure information, position information, etc., which are detected by the angular velocity sensor 41, the acceleration sensor 42, the magnetic sensor 43, the atmospheric pressure sensor 44, and the GPS sensor 45 and processed by the processor 31. Further, the flash memory 33 may store analysis results obtained based on the angular velocity information, acceleration information, magnetic information, atmospheric pressure information, position information, etc. The RAM 32 and the flash memory 33 are not limited to those mentioned above, and can be replaced with various storage devices.

The input device 34 is a device that accepts user's inputs and is, for example, a switch. For example, an instruction to activate the wearable sensor 30 and instructions to start and end measurement are entered to the input device 34. The I/F 35 is an interface for exchanging data with a device external to the wearable sensor 30. The wearable sensor 30 is connected to the computer 10 etc. via the I/F 35.

An external device connected to the wearable sensor 30, for example, the computer 10, reads information on the atmospheric pressure, angular velocity, acceleration, magnetic direction and position recorded in the wearable sensor 30 for a given period of time, reads the related analysis results, performs analysis based on these, calculates the position and posture etc. of the wearable sensor 30, and displays various kinds of information. The wearable sensor 30, which functions as such a motion sensor as mentioned above, can measure various motions of the analysis target.

<Configuration of Camera>

The camera 60 of the present embodiment is a camera that captures a video. The camera 60 includes a CPU 61, a ROM 62, a RAM 63, an image processing circuit 64, a recording medium 65, an I/F 66, an imaging optical system 71, an image sensor 72, a posture sensor 73, an input device 74, and a display device 75. These elements are connected together by means of a bus line 69.

The CPU 61 operates in accordance with a control program and controls the operation of each portion of the camera 60. The ROM 62 stores control programs and various parameters of the camera 60. The RAM 63 functions as a main memory of the CPU 61. The image processing circuit 64 includes, for example, an ASIC, and performs various kinds of image processing based on the image data obtained by the camera 60. The recording medium 65 stores video data obtained by the camera 60. The recording medium 65 may be detachable from the camera 60. The I/F 66 is an interface for exchanging data with a device external to the camera 60. The camera 60 is connected to the computer 10 via the I/F 66, for example.

The imaging optical system 71 forms an object image on the imaging surface of the image sensor 72. The image sensor 72 generates image data based on the image formed on the imaging surface. The posture sensor 73 includes, for example, an acceleration sensor. The posture sensor 73 detects a posture of the camera 60 and outputs posture information. The input device 74 includes input units, such as a recording button, a zoom button, and various setting buttons. The display device 75 includes, for example, a liquid crystal display. The display device 75 displays, for example, a live view image, and various setting menus.

[Operation of Information Processing System]

A description will be given of an operation of the information processing system 1. In the description set forth below, reference will be made to the situation shown in FIG. 1 by way of example. The situation shown in FIG. 1 is a situation in which the man 101 dressed in black and the woman 102 dressed in red are dancing together. The man 101 wears the first wearable sensor 30a, and the woman 102 wears the second wearable sensor 30b. In the description below, the first wearable sensor 30a and the second wearable sensor 30b will be collectively referred to as wearable sensor 30. The camera 60 captures a video of movements of the man 101 and the woman 102. The computer 10 obtains motion data acquired by the wearable sensor 30 and video data acquired by the camera 60, and analyzes the obtained data.

An example of the operation of the computer 10 will be described with reference to the flowchart shown in FIG. 3. In step S1, the computer 10 obtains video data acquired by the video capturing using the camera 60. In step S2, the computer 10 obtains motion data recorded by the wearable sensor 30.

In step S3, the computer 10 analyzes the video data and specifies a target object, which is a candidate of an analysis target in the video. The analysis target is, for example, a moving object wearing the wearable sensor 30. For example, when a person wears the wearable sensor 30, as shown in FIG. 1, the person is the analysis target. At this time, the computer 10 specifies an object to be analyzed, that is, a person, as a target object in the video. For example, the computer 10 extracts a person image from the image by filtering processing using a human template. For example, the method using a template enables the target object to be easily extracted from the image. In the example shown in FIG. 1, two persons, namely, the man 101 and the woman 102, are extracted.

In step S4, the computer 10 identifies movements of the specified target object in the image, based on the video data. In the example shown in FIG. 1, the movement of the man 101 and the movement of the woman 102 are identified. A technique based on optical flow or the like can be used for the identification of the movements. That is, for example, a motion vector in a video is specified based on the image.

In step S5, the computer 10 analyzes the motion data acquired in step S2. The computer 10 uses, for example, at least one of acceleration data, angular velocity data, magnetic direction data, satellite positioning data, and barometric data, for the analysis. The computer 10 calculates values of interest, such as the values of a position, acceleration, and rotation.

According to the present embodiment, in step S5, the computer 10 analyzes the motion data acquired from the wearable sensor 30 in step S2, but the wearable sensor 30 may analyze the motion data and the computer 10 may acquire this analysis result.

In step S6, the computer 10 compares the movement of the target object in the image acquired in step S4 with the data of interest acquired in step S5, and specifies a correspondence relationship. For example, the motion vector in the image acquired in step S4 is compared with movements of the wearable sensor 30 acquired in step S5, such as an acceleration, an angular velocity, and a magnetic direction, and a correspondence relationship is specified.

At this time, camera posture data representing the orientation of the camera, that is, the vertical position and horizontal position of the camera, is created based on the posture information obtained with the posture sensor 73 of the camera 60. Correction such as rotation of the motion vector in the image may be performed using the camera posture data. That is, the positional relationship between the posture of the camera 60 and the coordinates of the wearable sensor 30 may be initially set in advance. Since the posture of the camera 60 is taken into account in this manner, the correspondence relationship can be specified with high accuracy.

The computer 10 specifies a target object having the correspondence relationship as an analysis target. For example, in the example shown in FIG. 1, the data of the first wearable sensor 30a is specified as data on the movement of the man 101 and the data of the second wearable sensor 30b is specified as data on the movement of the woman 102. As described above, the processes of step S3 to step S6 enable which object in the image to be specified and analyzed, even if that object is not specified by the user and even if the wearable sensor 30 is not shown in the image.

In step S7, the computer 10 specifies the color of the analysis target specified in step S6 as an object color, based on the video data. The object color may be determined, for example, by comparing the areas of portions of an analysis target according to color and regarding the color of the widest area or a color similar thereto as the object color. Instead of the color of the widest area, a color determined by another rule using areas may be regarded as the object color. For example, the object color may be determined by selecting a color from among colors having an area larger than a predetermined area according to a predetermined rule (for example, in the case of determining a plurality of object colors based on positions, other object colors are taken into consideration).

It should be noted that a similar color can be determined based on a hue circle, for example. Where there are a plurality of analysis targets, as in the example shown in FIG. 1, object colors are preferably determined such that the differences in hue are larger than a predetermined value and can be easily identified. Therefore, where the analysis targets have a plurality of colors, object colors can be determined such that the difference in hue for each color is large. In the example shown in FIG. 1, for example, the black color of the man 101 and the red color of the woman 102 are specified.

In step S8, the computer 10 creates an image showing the motion analysis result acquired in step S6. The object color specified in step S7 is determined as the color of the motion data analyzed in step S5, and an image is created in which the color showing the analysis result is associated with the color relating to the analysis target. In step S9, the computer 10 displays the created image on the display device 16.

Figure 4:
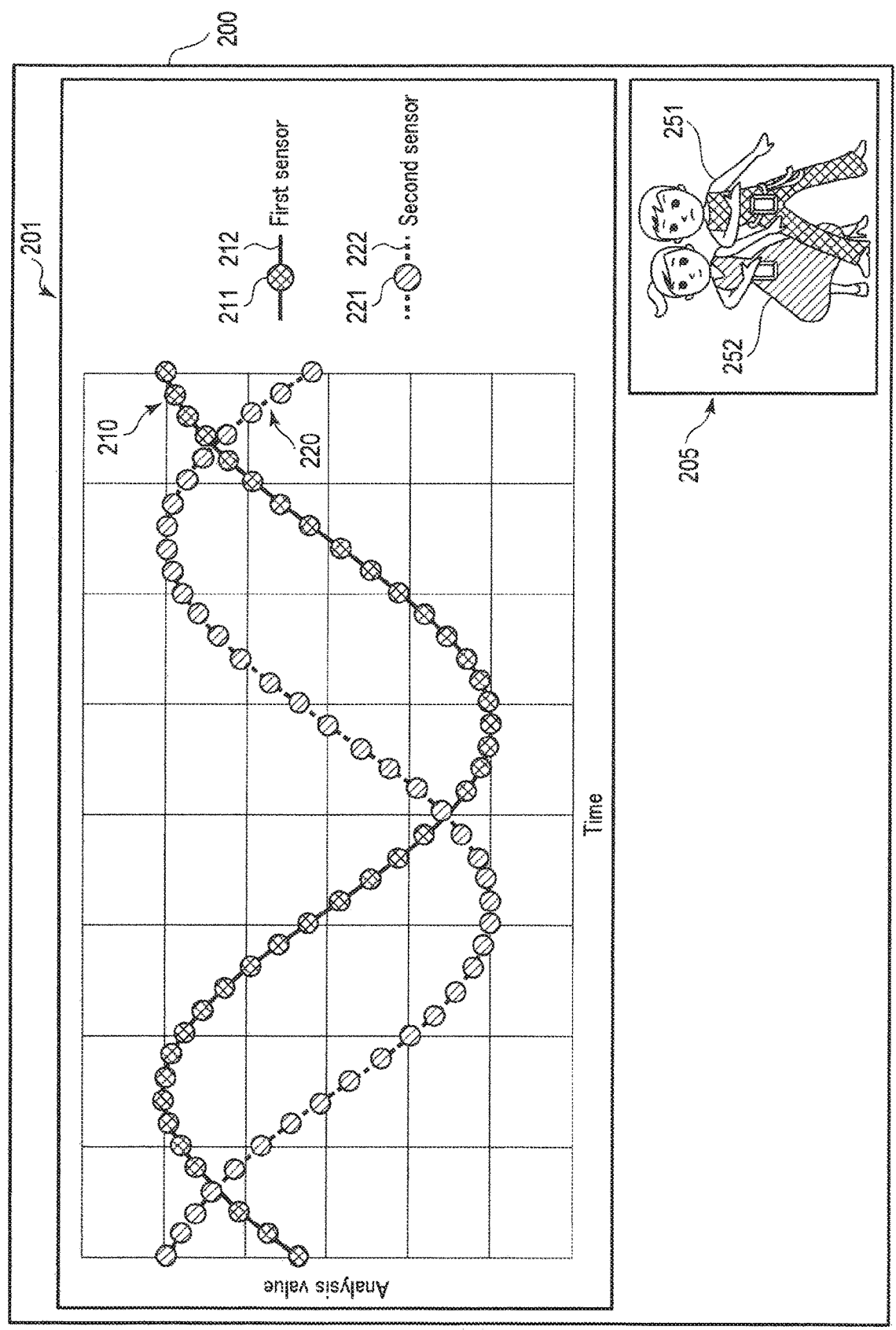
FIG. 4 is a diagram schematically illustrating an example of a display image according to an embodiment.

FIG. 4 shows an example of the display image displayed in step S9. In the example shown in FIG. 4, the display image 200 includes a graph region 201 and an image region 205. The graph region 201 is a region for graphically showing analysis results obtained based on detection values of the wearable sensor 30. The image region 205 is a region in which a video captured by the camera 60, a video obtained by editing the video, and a still image extracted from the video, etc. are displayed.

In the example shown in FIG. 4, the image region 205 includes a man image 251 which is an image of the man 101 and a woman image 252 which is the image of the woman 102. The graph region 201 includes a first data representation 210 which is an analysis result based on the data acquired by the first wearable sensor 30a worn by the man 101, and a second data representation 220 which is an analysis result based on the data acquired by the second wearable sensor 30b worn by the woman 102.

In the present embodiment, the first data representation 210 is shown in the color corresponding to the man 101, and the second data representation 220 is shown in the color corresponding to the woman 102. To be specific, the markers 211 and line 212 of the first data representation 210 are displayed in black. The markers 221 and line 222 of the second data representation 220 are displayed in red.

As can be seen from the above, the computer 10 serves as: a video data acquisition unit which acquires, as video data, data on a video relating to at least one moving object; a motion data acquisition unit which acquires data on the motion of an object as motion data; an object specifying unit which specifies, as an analysis target, an object performing the motion corresponding to the motion data included in the video; a color specifying unit which specifies a color relating to the analysis target as an object color; and a determining unit which determines the specified object color as the color of the motion data.

By performing representations as in the present embodiment, the correspondence relationship between the analysis targets in the image displayed in the image region 205 and the representations of the analysis results shown in the graph region 201 can be recognized intuitively and obviously by a viewer of the display image 200.

FIG. 4 shows an example in which the display image 200 includes both the graph region 201 and the image region 205, but the display image 200 does not have to include the image region 205 but includes only the graph region 201. It may be that a viewer of the display image 200 views the graph region 201 while confirming an image of a person, who is an analysis target, on another display screen, that the viewer views the graph region 201 while looking at a photograph in which the person is shown, or that the viewer views the graph region 201 while recalling the person the viewer knows. Where graphs or the like are displayed in real time, the viewer may view the graph region 201 while simultaneously watching the movement of the analysis target. Therefore, even in the case where only the graph region 201 is included in the display image 200, the representations according to the present embodiment, in which the colors are associated with the colors of the analysis targets, can be advantageously distinguishable by the viewer of the graph region 201.

Although legends are shown in the graph region 201 of the display image 200 depicted in FIG. 4, the legends are not necessarily required according to the present embodiment. Since the colors of the representations and the colors of the analysis targets are associated with each other, it is possible to recognize which data the lines of the graph show, without having to look at the legends.

In this example, two persons are shown, namely, two persons are to be analyzed, but one person or three or more persons may be analyzed. Where only one person is to be analyzed and only one person is shown in the video, the correspondence relationship between the person shown in the video and the person measured with the sensor can be understood with no need to analyze the movement or the like. Where only one person is the analysis target and a plurality of persons or objects are shown in the video, the person to be analyzed is selected from the objects. Even if a plurality of objects are to be analyzed, the present embodiment enables the viewer of the display image 200 to easily recognize the correspondence relationship between the analysis targets and the analysis results indicated in the display image 200.

[Variations of Display Image]

Some examples of variations of the display image will be described.

<First Variation>

Figure 5:
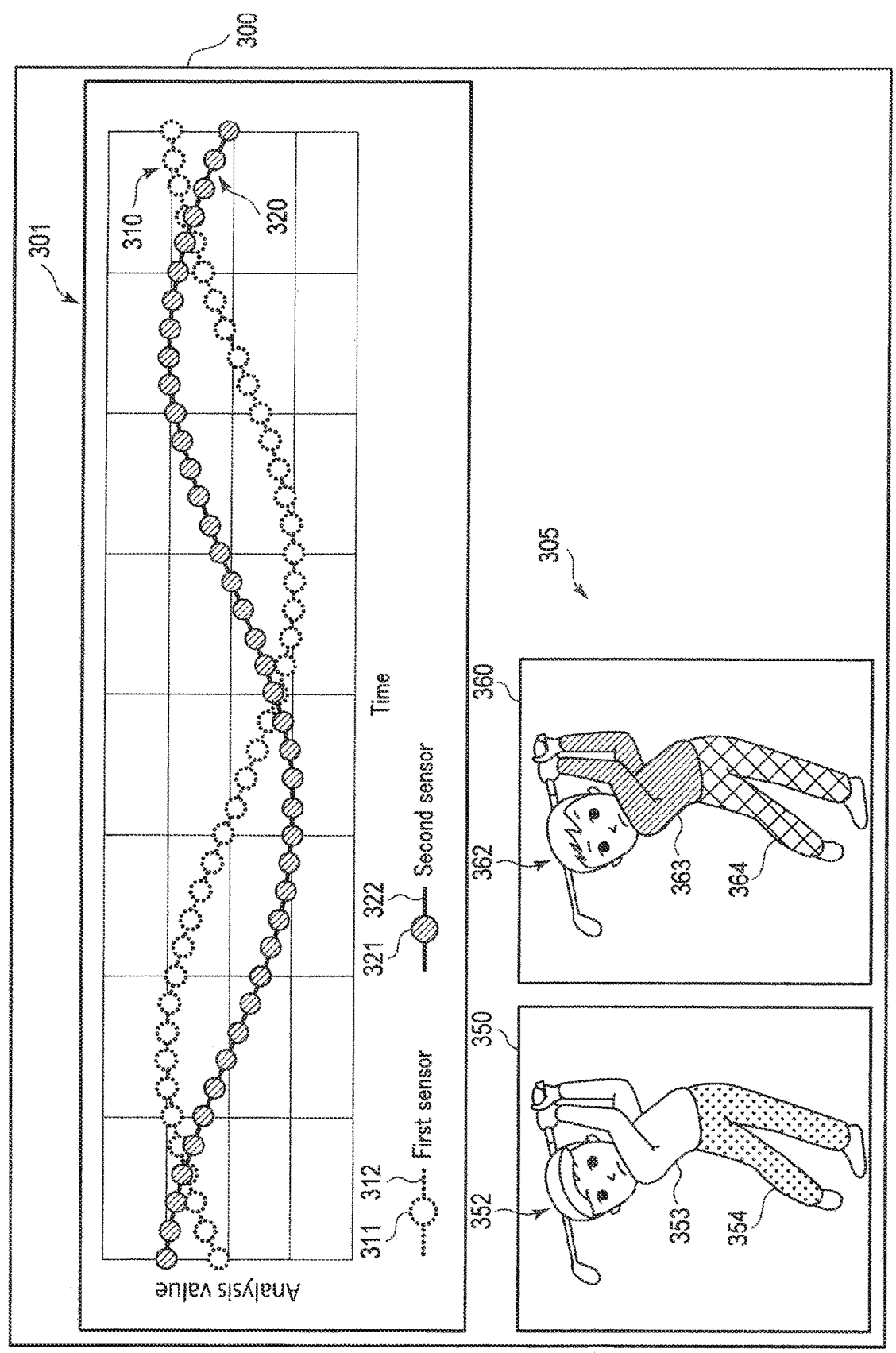
FIG. 5 is a diagram schematically illustrating an example of a display image according to an embodiment.

FIG. 5 shows an example of a display image according to the first variation. In this example, the display image 300 includes a graph region 301 and an image region 305. The image region 305 includes a first image 350 in which a first person 352 is shown and a second image 360 in which a second person 362 is shown. The example shown in FIG. 5 is a case where a golf swing is analyzed. For example, the first person 352 and the second person 362 may be the same person, and the capturing of a video and the collection of motion data may be performed on different days. In addition, the first person 352 and the second person 362 may be different persons, and the capturing of a video and the collection of motion data may be performed simultaneously or at different timings.

In the first image 350, the color of the clothes the first person 352 wears on the upper body 353 is white, and the color of the clothes the first person 352 wears on the lower body 354 is yellow. In the second image 360, the color of the clothes the second person 362 wears on the upper body 363 is red, and the color of the clothes the second person 362 wears on the lower body 364 is black.

In the graph region 301, a first data representation 310 which is data on the first person 352 and a second data representation 320 which is data on the second person 362 are shown. In the first data representation 310, the color inside the markers 311 is white, which is the color of the clothes the first person 352 wears on the upper body 353, and the color of the outlines of the markers 311 and the line 312 are yellow, which is the color of the clothes the first person 352 wears on the lower body 354. In the second data representation 320, the color inside the markers 321 is red, which is the color of the clothes the second person 362 wears on the upper body 363, and the color of the line 322 and the outlines of the markers 321 is black, which is the color of the clothes the second person 362 wears on the lower body 364.

As in the first variation, colors of two or more regions of an analysis target, such as the upper body and the lower body of a person, may be extracted, and analysis results may be shown in two or more colors. According to this expression, color information increases, and representations with good discrimination can be realized even if a large number of data items are displayed or if the same color is included in different analysis targets.

In the above example, the object color is the color of a wide area of the analysis target, but as in the first variation, various methods can be used for determining an object color as the color representing the analysis target. The color of the upper body and the color of the lower body can be specified using, for example, templates of an upper body type and a lower body type. In addition, the object color is not limited to the color of clothes, and the colors of a cap, gloves, shoes, etc. may be extracted as object colors. Further, not only the color of the worn clothes, but also the color of hair, the color of a tool being used, etc. may be extracted as object colors.

<Second Variation>

Figure 6:
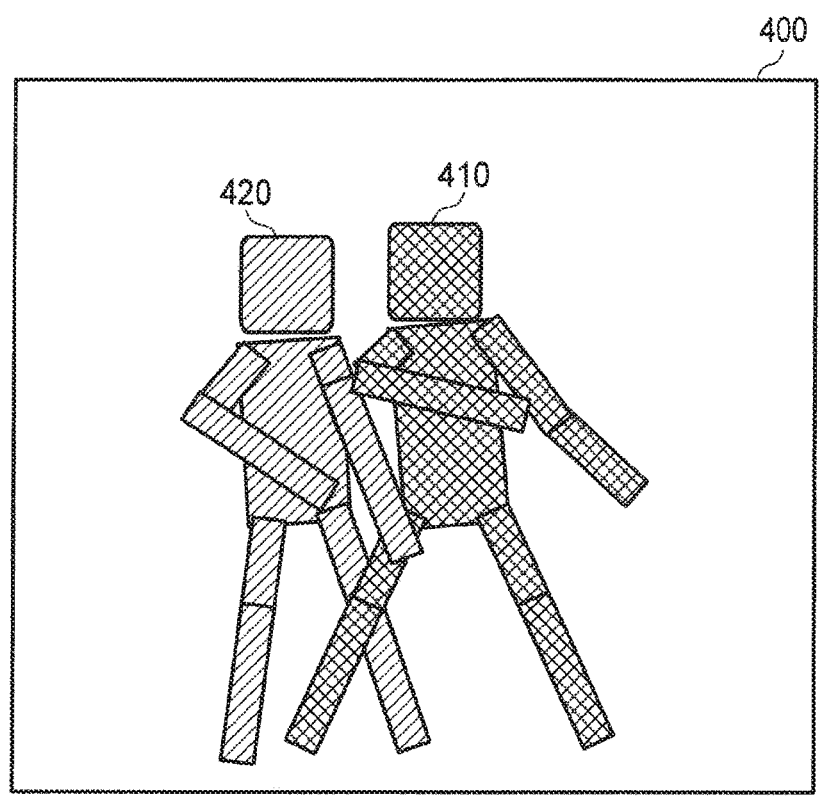
FIG. 6 is a diagram schematically illustrating an example of a display image according to an embodiment.

In the above example, analysis results of motion data are shown as a graph, and the colors of the markers and line are associated with the color of the analysis target. However, this is not restrictive. FIG. 6 shows an example of a display image according to the second variation. The display image 400 may be an image using a humanoid model, as shown in FIG. 6, for example. FIG. 6 illustrates an example showing analysis results of the scene shown in FIG. 1.

The display image 400 includes a first humanoid model 410 showing the analysis results of the man 101 and a second humanoid model 420 showing the analysis results of the woman 102. The first humanoid model 410 schematically indicates the movement of the man 101, and the second humanoid model 420 schematically indicates the movement of the woman 102. It should be noted that the color of the first humanoid model 410 is black, the same color as the clothes of the man 101, and the color of the second humanoid model 420 is red, the same color as the clothes of the woman 102.

For example, humanoid models are not limited to those shown in FIG. 6, in which human figures are represented by bars. The analysis results can be represented by animation using various expression forms. Needless to say, where an analysis target is not a person, the shape of that analysis target can be displayed.

Even where analysis results are indicated by various images of humanoid models or by animation, the analysis results are expressed in the color associated with the color of the analysis target, so that a representation with good discrimination can be realized.

<Third Variation>

Display images are not limited to graphics, such as graphs or humanoid models. Analysis results included in a display image may be shown in the form of a table. Where the display mode is a table, representations with good discrimination can be realized by associating the character colors in the table with the colors of analysis targets.

Where an image representing analysis results is a motion display image, various display forms can be used, including the display form used in the graph region 201 of FIG. 4, the display form used in the graph region 301 of FIG. 5, the display form used in the display image 400 of FIG. 6, and the display form used in the table of the third variation. In a display image, it is preferable that a motion display image and a video be displayed side by side, as shown in FIGS. 4 and 5, because the analysis results and the video can be viewed at a glance.

[Variation of Identification Method of Analysis Target]

A variation of the identification method of an analysis target will be described. In the above example, a motion vector of an image is obtained from video data, and this motion vector is compared with an analysis result of a detection value of the wearable sensor 30 to specify a correspondence relationship. However, the method for obtaining the correspondence relationship is not limited to this.

For example, wearable sensors 30 may be provided with different markers unique to them. In this case, an analysis target can be specified based on the marker image detected in an image and indicating which wearable sensor 30 is used. That is, an analysis target can be identified based only on an image, with no need for comparing motion data, as in steps S3 to S6 described with reference to the flowchart of FIG. 3. In this method, however, it is necessary to capture markers with the camera 60.

The markers provided for each wearable sensor 30 may be markers used exclusively for identifying the wearable sensor 30 or may be markers having other functions as well. For example, where the wearable sensor 30 uses visible light communications for transmitting motion data, the visible light used for communications can function as the markers.

In this case, the visible light may indicate a light emission pattern representing the ID of the wearable sensor 30.

By providing markers for the wearable sensor 30 in this manner, an analysis target can be associated with the wearable sensor 30, with no need for performing complicated image analysis, such as image analysis for detecting optical flow.

Separately from the markers of the wearable sensor 30, a marker for specifying an analysis target may be attached to the analysis target on which the wearable sensor 30 is worn. An analysis target can also be identified by such a marker in a video.

[Variation of Motion Data]

In connection with the above example, reference was made to the case where data acquired by using the wearable sensor 30 is used as motion data. However, this is not restrictive.

Motion data may be acquired based on the video captured by the camera 60. In this case, the information processing system 1 does not have to use the wearable sensor 30. In other words, the information processing system 1 includes a camera 60 that captures motion data and a video serving as video data, and a computer 10 that analyzes the video data and the motion data.

The motion data may be data acquired by a distance image sensor, for example. In this case, the information processing system 1 includes a range image sensor instead of the wearable sensor 30.

In these cases, an analysis target is specified based on video data, so that the processes of steps S3 to S6 described with reference to FIG. 3 are replaced by analyzing motion data based on a video and an output of the range image sensor and specifying an analysis target based on an image.

As described above, the information processing system 1 according to the present embodiment is applicable not only to the wearable sensor 30 but also to various devices capable of acquiring data for analyzing the motion of an analysis target.

[Variation of Analysis Target]

In the above example, a person is taken as an analysis target. However, the analysis target is not limited to a person, and any object may be used. For example, the analysis target may be a robot, an automobile or the like. In addition, the analysis target may be an animal such as a racehorse.

In the above example, one wearable sensor 30 is attached to one person which is one analysis target, but this is not restrictive. A plurality of wearable sensors 30 may be attached to one person. That is, movements of a plurality of portions of one person may be analyzed. For example, the wearable sensor 30 may be attached to each of the upper body and the lower body of a person. In this case, an analysis result pertaining to the upper body may be displayed in the color of the clothes worn on the upper body, and an analysis result pertaining to the lower body may be displayed in the color of the clothes worn on the lower body. In this example, the analysis targets are the upper body and the lower body of one person, and there are two analysis targets for one person. In this manner, one target object may have a plurality of analysis targets. Even in this case, the color of each of the analysis targets of one target object and the analysis result of the corresponding analysis target are associated with each other.

[Variation of System Configuration]

In the information processing system 1, an information processing apparatus provided with a camera that functions as both a camera 60 and a computer 10 may be used in place of the camera 60 and computer 10 mentioned above.

In any of the cases described above, the present embodiment provides a display image which can be easily recognized by the user. It is a matter of course that the variations described above can be combined together when they are put into practice.

In the above embodiment, motion data was described as target data, but biological information on pulses and heartbeats may be used as target data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An information processing apparatus comprising:
a processor; and
a storage that stores a program to be executed by the processor, wherein the processor operates according to the program stored in the storage and executes:
a video data acquisition process of acquiring data on a video of at least one moving object as video data;
a measurement information data acquisition process of acquiring data representing measurement information on the object as measurement information data, wherein the measurement information data is data acquired using a sensor;
an object specifying process of specifying the object corresponding to the measurement information data included in the video, as an analysis target, wherein the object specifying process includes:
analyzing the video to specify a motion vector related to the object, and
comparing the motion vector with information on motion of the object acquired based on at least one of acceleration data, angular velocity data, magnetic direction data, satellite positioning data and barometric pressure data, which are included in the measurement information data and acquired by the sensor;
a color specifying process of specifying a color of the analysis target as an object color; and
a determination process of determining the object color specified by the color specifying process as a display color to be displayed when the measurement information data is displayed.

2. The information processing apparatus according to claim 1, wherein the object comprises a marker corresponding to the sensor,
the video includes an image of the marker, and
the object specifying process includes specifying the analysis target based on the marker included in the image.

3. The information processing apparatus according to claim 2, wherein the marker is provided for the sensor.

4. The information processing apparatus according to claim 1, wherein the measurement information data is data acquired by analyzing the video or data acquired by a range image sensor.

5. The information processing apparatus according to claim 1, wherein the measurement information data acquisition process includes acquiring a plurality of pieces of measurement information data, and
the object specifying process includes specifying the analysis target for each of the pieces of measurement information data.

6. The information processing apparatus according to claim 5, wherein the color specifying process includes specifying the object color for each of a plurality of analysis targets such that differences in hue are larger than a predetermined value.

7. The information processing apparatus according to claim 1, wherein the color specifying process includes
specifying an area for each color of the analysis target and specifying a color determined based on the area or a color similar thereto as the object color.

8. The information processing apparatus according to claim 1, wherein the object specifying process includes identifying at least one object included in the video by filtering processing that uses a template in accordance with a shape of the object.

9. The information processing apparatus according to claim 1, wherein the color specifying process includes specifying a plurality of colors as object colors for the analysis target, and
the determination process includes determining the plurality of colors as display colors to be displayed when the measurement information data is displayed.

10. The information processing apparatus according to claim 1, wherein the processor further executes a display creation process of creating a measurement information display image for displaying the measurement information data using the object color determined by the determination process.

11. The information processing apparatus according to claim 10, wherein the color specifying process includes specifying two colors for the analysis target, as object colors, and
the display creation process includes:
preparing the measurement information display image including a graph representing the measurement information data; and
using one of the two colors as a color of a marker of the graph representing the measurement information data on the analysis target, and another one as a color of a line of the graph representing the measurement information data on the analysis target.

12. The information processing apparatus according to claim 10, wherein the display creation process includes:
preparing the measurement information display image including a table representing the measurement information data; and
using the object color as a color of a character of the table representing the measurement information data on the analysis target.

13. The information processing apparatus according to claim 10, wherein the display creation process includes:
preparing the measurement information display image including a humanoid model representing the measurement information data; and
using the object color as a color of the humanoid model representing the measurement information data on the analysis target.

14. The information processing apparatus according to claim 10, wherein the display creation process includes:
preparing the measurement information display image including an animation image that indicates the measurement information represented by the measurement information data as a shape; and using the object color as a color of the animation image of the measurement information data on the analysis target.

15. The information processing apparatus according to claim 10, wherein the display creation process includes creating a display image including both the measurement information display image and the video.

16. An information processing method comprising:
acquiring data on a video of at least one moving object as video data;
acquiring data representing measurement information on the object as measurement information data, wherein the measurement information data is data acquired using a sensor;
specifying the object corresponding to the measurement information data included in the video, as an analysis target, wherein the specifying of the object includes:
analyzing the video to specify a motion vector related to the object, and
comparing the motion vector with information on motion of the object acquired based on at least one of acceleration data, angular velocity data magnetic direction data, satellite positioning data and barometric pressure data, which are included in the measurement information data and acquired by the sensor;
specifying a color of the analysis target as an object color; and
determining the specified object color as a display color used when the measurement information data is displayed.

17. A non-transitory computer-readable storage medium recording a program that includes:
a video data acquisition code of causing a computer of an information processing apparatus to acquire data on a video of at least one moving object as video data;
a measurement information data acquisition code of causing the computer to acquire data representing measurement information on the object as measurement information data, wherein the measurement information data is data acquired using a sensor;
an object specifying code of causing the computer to specify the object corresponding to the measurement information data included in the video, as an analysis target, wherein the object specifying code includes:
causing the computer to analyze the video to specify a motion vector related to the object, and
causing the computer to compare the motion vector with information on motion of the object acquired based on at least one of acceleration data, angular velocity data, magnetic direction data, satellite positioning data and barometric pressure data, which are included in the measurement information data and acquired by the sensor;
a color specifying code of causing the computer to specify a color of the analysis target as an object color; and
a determination code of causing the computer to determine the specified object color as a display color used when the measurement information data is displayed.

* * * * *